United States Patent [19]
Becker

[11] Patent Number: 5,837,942
[45] Date of Patent: Nov. 17, 1998

[54] COMPUTER CPU PLUG PROTECTOR AND COVER

[76] Inventor: Paul R. Becker, 11 Lopez Key, Bellevue, Wash. 98006

[21] Appl. No.: 538,641

[22] Filed: Oct. 4, 1995

[51] Int. Cl.⁶ .................................................. H01B 17/00
[52] U.S. Cl. ...................... 174/138 F; 174/135; 361/683; 361/687
[58] Field of Search ..................................... 174/135, 136, 174/17 VA, 138 F; 361/683, 687, 724, 725, 726, 727, 690, 692, 693, 695

[56] References Cited

U.S. PATENT DOCUMENTS

| | | | |
|---|---|---|---|
| 4,774,390 | 9/1988 | Lehman et al. | 200/304 |
| 4,898,009 | 2/1990 | Lakoski et al. | 70/58 |
| 5,030,128 | 7/1991 | Herron et al. | 439/372 |
| 5,142,442 | 8/1992 | Daniels et al. | 361/384 |
| 5,174,293 | 12/1992 | Hagiwara | 128/653.1 |
| 5,199,888 | 4/1993 | Condra et al. | 439/142 |

OTHER PUBLICATIONS

IBM Technical Disclosure Bulletin, vol. 31, No. 10, Mar. 1989.
Interface, Los Angeles, California, Cache–Back Cable Management for IBM PC and XT Computers, Sep. 1988.

*Primary Examiner*—Kristine L. Kincaid
*Assistant Examiner*—Kaman D. Cuneo

[57] ABSTRACT

A cover which improves the aesthetic appearance of the back of a desktop computer which also provides protection for the leads and wires protruding from the back of the CPU (Central Processing Unit). The cover can be conformally molded of an opaque plastic material of sufficient thickness and strength as to provide protection for the rear components of the CPU. The design of this cover presents a shadow over the unsightly protruding wiring while maintaining adequate cooling airflow using a venturi generated by the CPU cooling fan and natural heat convection. Attachment shall be of a simple, easily attachable/detachable type requiring little or no modification to the CPU housing using preferably nonelectically conductive materials such as stick on hook and loop fasteners. The cover design shall be adaptable for both conventional desktop and tower type (vertical) CPUs.

1 Claim, 5 Drawing Sheets

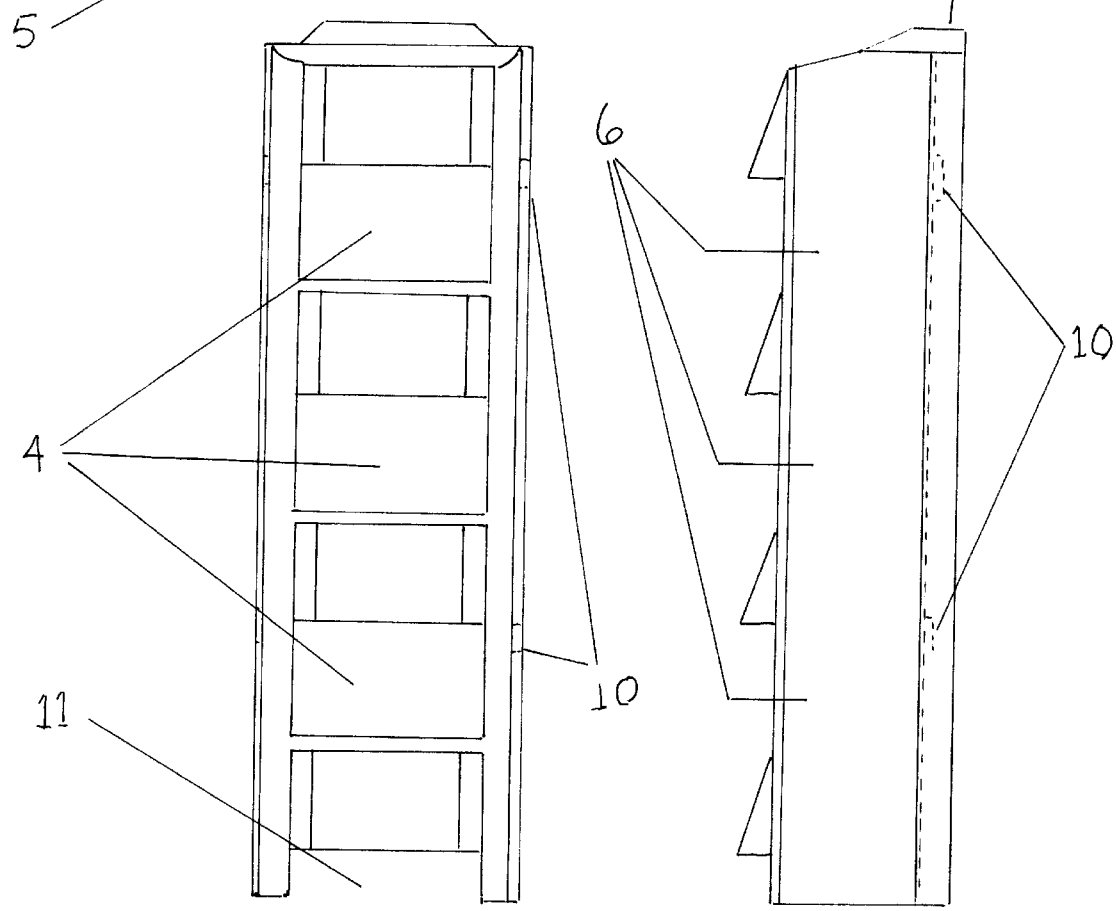

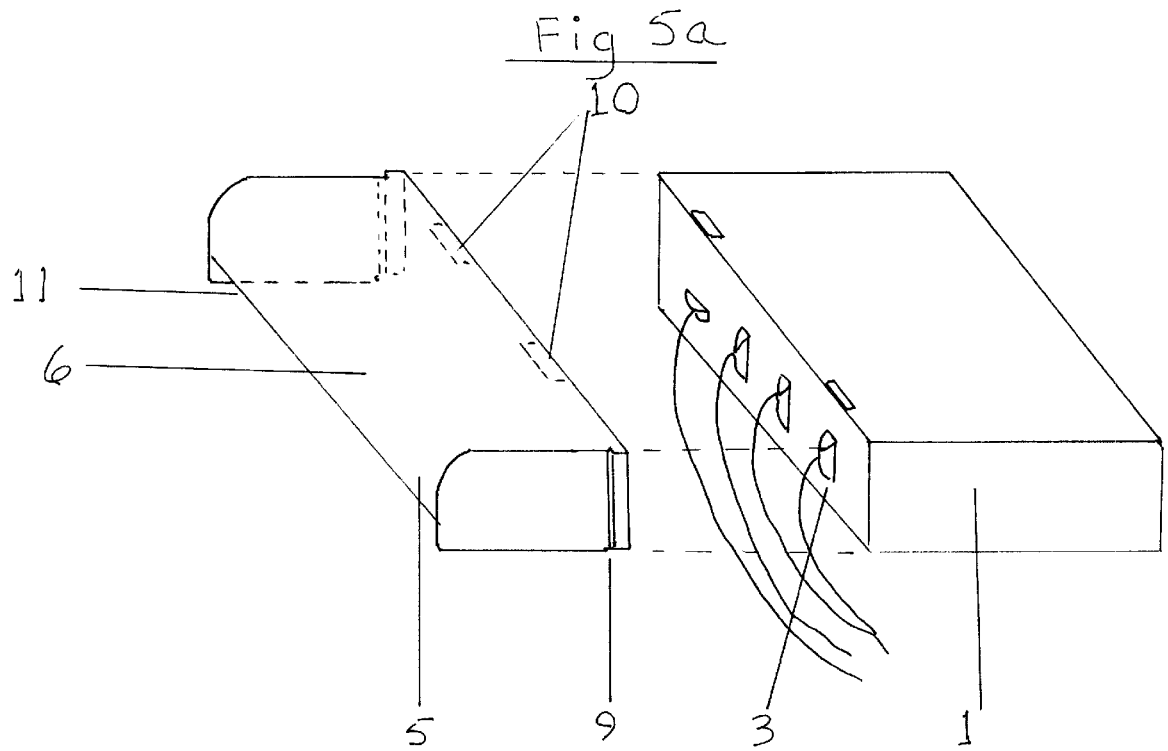
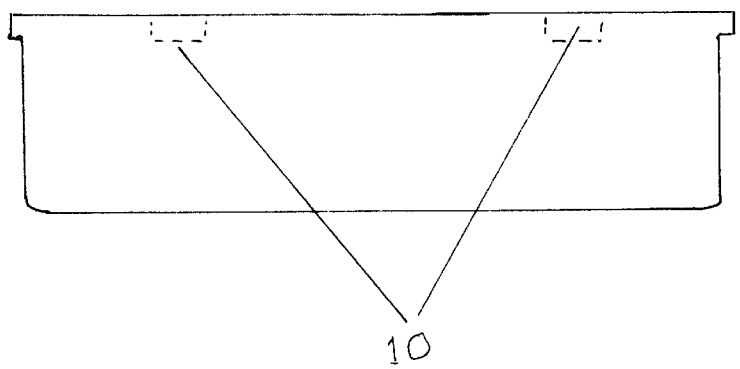
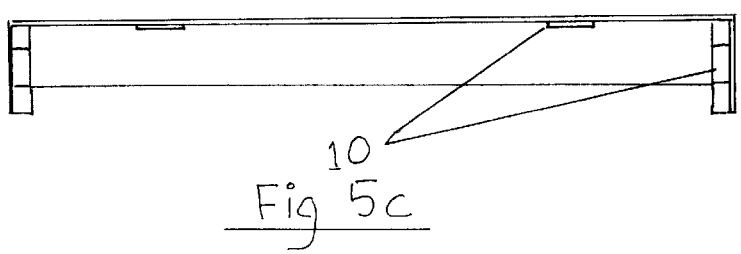

COMPUTER CPU PLUG PROTECTOR AND COVER

BACKGROUND

This invention relates in general to a cover which improves the aesthetics of, while protecting electronic components such as, for example, computers.

Computers, especially smaller computers known as Personal Computers, or "PC's" have become commonplace in many homes and most businesses. Many business applications for PC's involve a work station where the monitor and CPU face the worker, and the unsightly rear of the CPU face the customer. This arrangement is typical where a large amount of information is required from the customer and inputted directly into the computer. For many business applications, and increasingly with home use, PC's are being tied together with other PC's and larger mainframes. As this occurs, the integrity of the plug in connectors and associated wiring located in the rear of the CPU has become increasingly important as one slight interruption can cause an immense loss of information and time spent restoring that information. Commonly these types of interruptions occur when the CPU is inadvertently pushed back against a wall or foreign objects such as books or papers fall behind a CPU.

Enclosures for computers and components, such as U.S. Pat. No. 4.626,048 to Goodlander which discloses a printer housing for soundproofing, or U.S. Pat. No. 5,163,870 to Cooper which discloses a dust cover for PC components including specific design for a CPU, are not new.

Several prior patents protect the plugs on a CPU by transferring the impact force to the frame of the unit. U.S. Pat. No. 5,030,128 to Herron et al uses a docking module system for a non fan cooled laptop computer, and U.S. Pat. No. 5,142,442 to Daniels et al utilizes a combined fan spacer and wire guide module for a fan cooled unit. Both require extensive modification to the CPU and electrically conductive hardware to install, and preclude easy access to the back of the unit.

U.S. Pat. No. 4,898,009 to Laski et al discloses a security cover for a CPU requiring a cooling fan. This prior art does claim some possible improvement in the aesthetics of the computer work station, but it requires unsightly vents in the top which allow overhead lighting to illuminate the plugs, wiring, and the back of the CPU. In addition to the primary topside vents, the are small ports on the bottom longitudinal member which are primarily for cables and secondarily for minimally increased air circulation, which are especially ineffective when filled with cables. The efficiency of this cooling airflow path must be doubted because of the required perpendicular change in flow generated by the fan orientation to the venting ports. Although this prior art does provide complete protection for the CPU plugs, it requires extensive hardware modification for installation, extensive time for removal/installation, and prohibits access to the CPU plugs and wiring.

SUMMARY OF INVENTION

The purpose of this invention is to provide a cover that will protect and hide from view the plugs and connectors which protrude from the back of a computer CPU.

Significant aspects and features of this invention include a opaque material molded to a shape which will create a "shadow effect" from typical office overhead lighting so as to render the plugs, fan, and other unsightly parts of the back of a computer not visible, while providing adequate airflow for electronic cooling using a venturi effect and natural convection. Another feature of this invention is to provide structural protection for the plugs on the back of the CPU, transferring the force through the molded stress transfer areas directly to the frame of the CPU should it be accidentally pushed against the wall or some other immovable or heavy object.

The present invention is created out of nonelectrically conducting materials, conforming to the dimensions of the CPU. It is molded so as to have a vertical shoulder which will set flush with the vertical sides of the CPU for attachment and stress transfer. It may be adjustable in the horizontal dimension, and shall include a quick release attachment mechanism made from stick on hook and loop strips. Such an attachment mechanism shall require little or no modification to the CPU, and once attached will allow easy removal and reinstallation for immediate access to the plugs and the back of the computer.

One embodiment of this invention is designed for conventional desktop PC CPUs, while another is for "tower" or vertically stacked CPU's. Both if these embodiments shall utilize (a) top vent(s) which shall overlap the vertical plane of the back of the CPU so as to provide air flow to create a venturi with the CPU cooling fan, yet shadow incident overhead light from the plug area of the CPU.

An additional embodiment of this invention is designed for nonlaptop CPU's which do not have fan driven integral cooling.

Since all embodiments of this invention are constructed of molded plastic, all are obviously capable of supporting molded in advertisements and product logos in highly visible areas.

BRIEF DESCRIPTION OF THE DRAWINGS

Other objects of the present invention and many of its attendant advantages will be readily appreciated as the present invention becomes better understood by reference to the following detailed description when considered in connection with the accompanying drawings, in which like reference numbers designate like features throughout the following figures:

FIG. 4A illustrates a front view of the protective cover for a tower type CPU, FIG. 4B illustrates a side view of the protective cover for a tower type CPU, FIG. 4C illustrates a top view of the protective cover for a tower type CPU, FIG. 5A illustrates a perspective view of yet another alternate embodiment of the protective cover for a CPU without a cooling fan, FIG. 5B illustrates a top view of the embodiment of FIG. 5A.

FIG. 5C illustrates a front view of the embodiment of FIG. 5A.

FIG. 5D illustrates a side view of the embodiment of FIG. 5A.

REFERENCE NUMERALS IN DRAWINGS

1 Computer Central Processing Unit (CPU)
2 Cooling Fan for CPU
3 Plugs from CPU to Accessories
4 Open Space for Cooling Airflow
5 Shadow Flap
6 Shadow Area
7 Top Vent(s)
8 Venturi Airflow
9 CPU Frame Stress Transfer Areas
10 Hook and Loop Fasteners
11 Space for Plug Wires

DETAILED DESCRIPTION OF THE PREFERRED EMBODIMENTS

Figure 1:
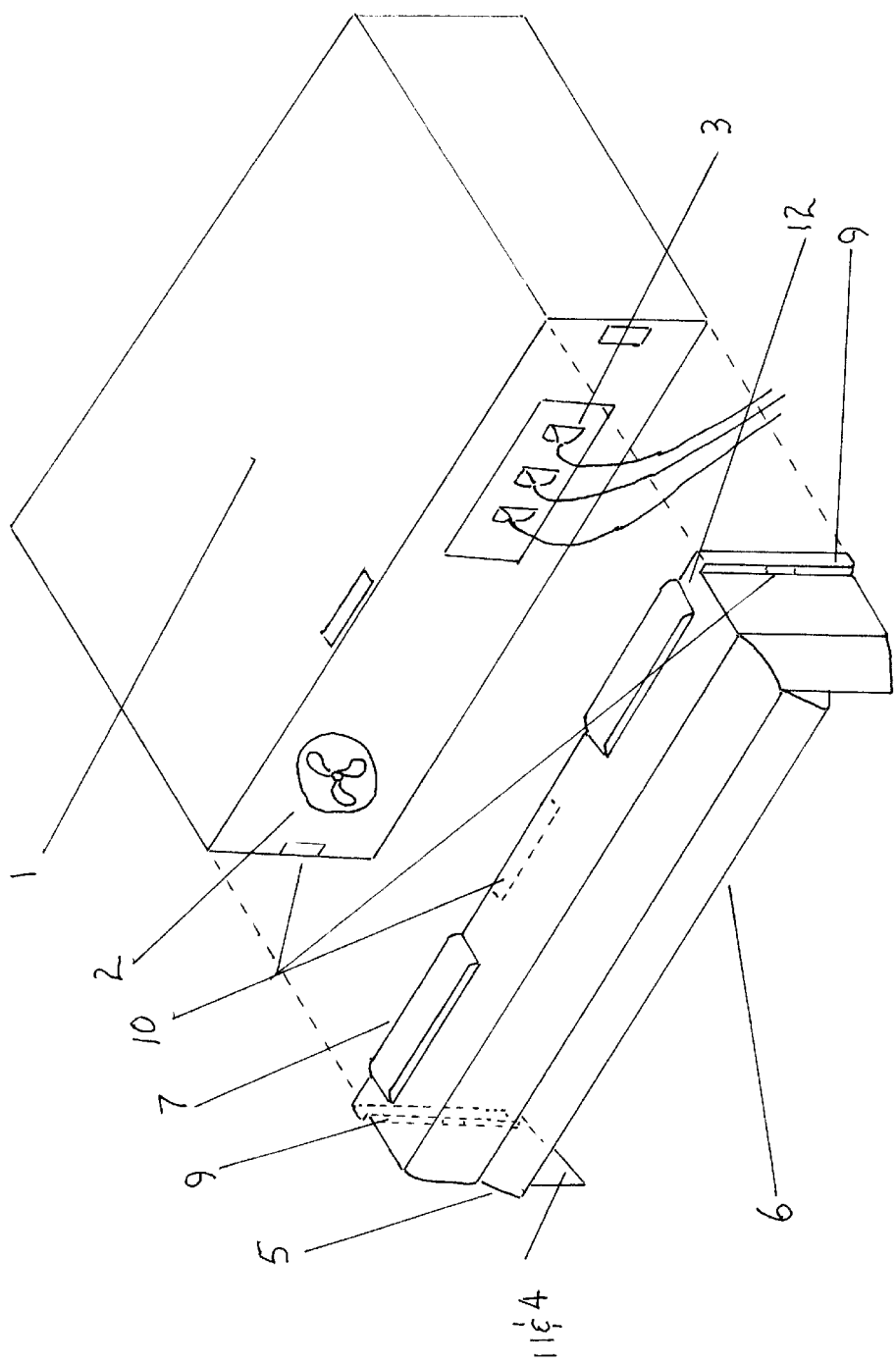
FIG. 1 illustrates a perspective view of the protective cover for a conventional horizontal personal computer CPU.

FIG. 1 illustrates a perspective view of the plug cover for the back of a personal computer CPU, of the conventional horizontal configuration. Particularly illustrated is the proximity of the unsightly cooling fan 2 and auxiliary plugs 3 on the back of the CPU 1, to the shadow area 6, generated by the large Shadow Flap 5. This design of the overall solid cover and the top vents 7 which overlap the vertical plane of the back of the CPU, minimizes the amount of light from an overhead source which can illuminate the cooling fan 2 or the auxiliary plugs 3, hiding them in a deep shadow. When the CPU is viewed from an elevation of greater than a slight angle, the rear of the CPU is blanked from view by the Shadow Flap 5. Also illustrated is the vertical CPU Frame Stress Transfer Areas 9 which will transfer a majority of the impact stress from the protective cover structure directly to the frame of the CPU should the CPU be pushed against an immovable object, or should a heavy object fall on the cover. Also illustrated are the positions of the Hook and Loop Fasteners 10.

Figure 2:
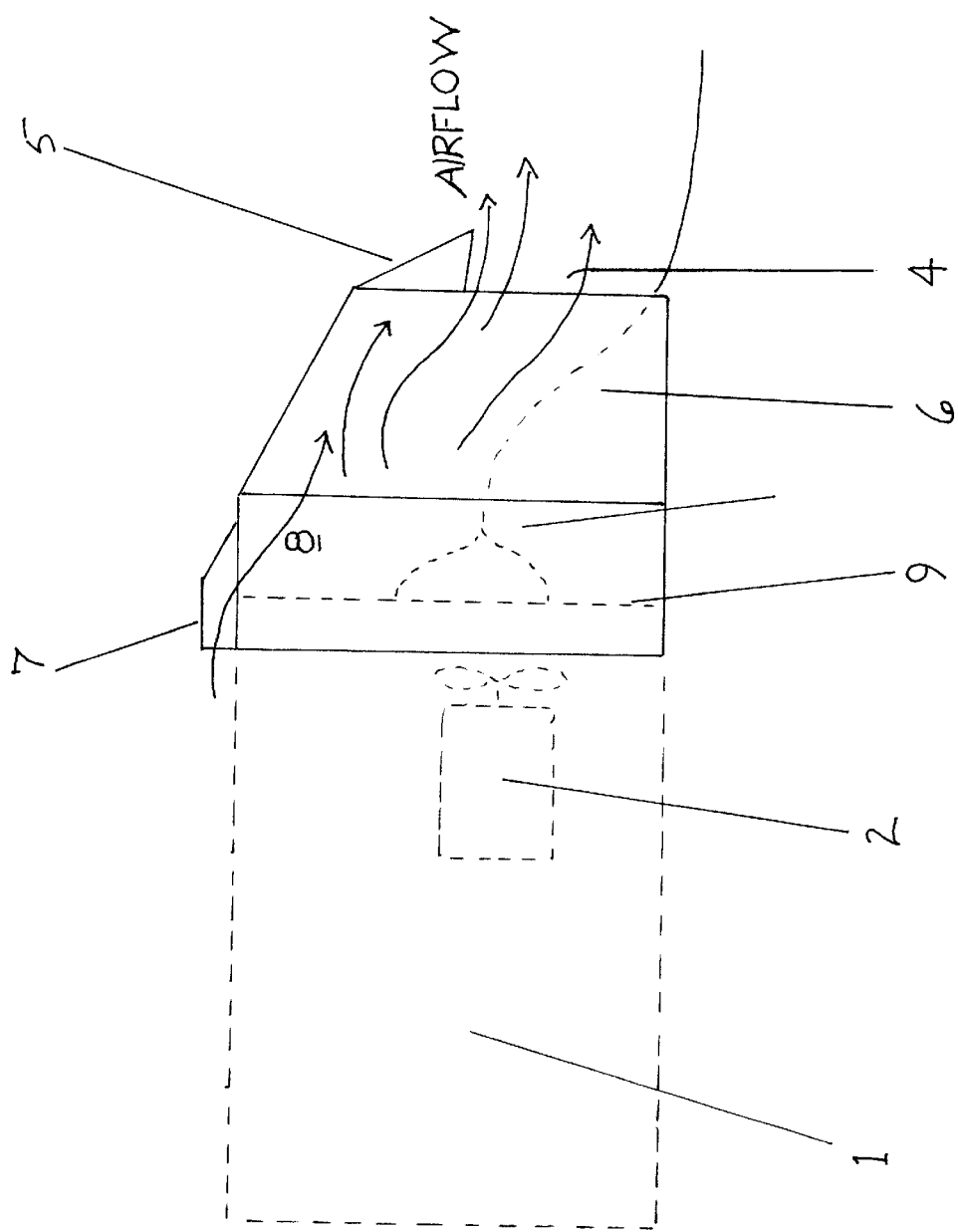
FIG. 2 illustrates a side view of the protective cover for a horizontal personal computer CPU, the associated venturi cooling airflow pattern, and the overlapping (the back of the CPU) vent design.

FIG. 2 illustrates the side view of the protective cover on the CPU. Particularly illustrated is the venturi airflow 8 generated by the large open space for cooling airflow 4 and the proximity of the top vent 7 relative to the vertical plane of the back of the CPU. The top vent 7 which is not on the same side as the cooling fan 2, will function as a convection vent.

Figure 3:
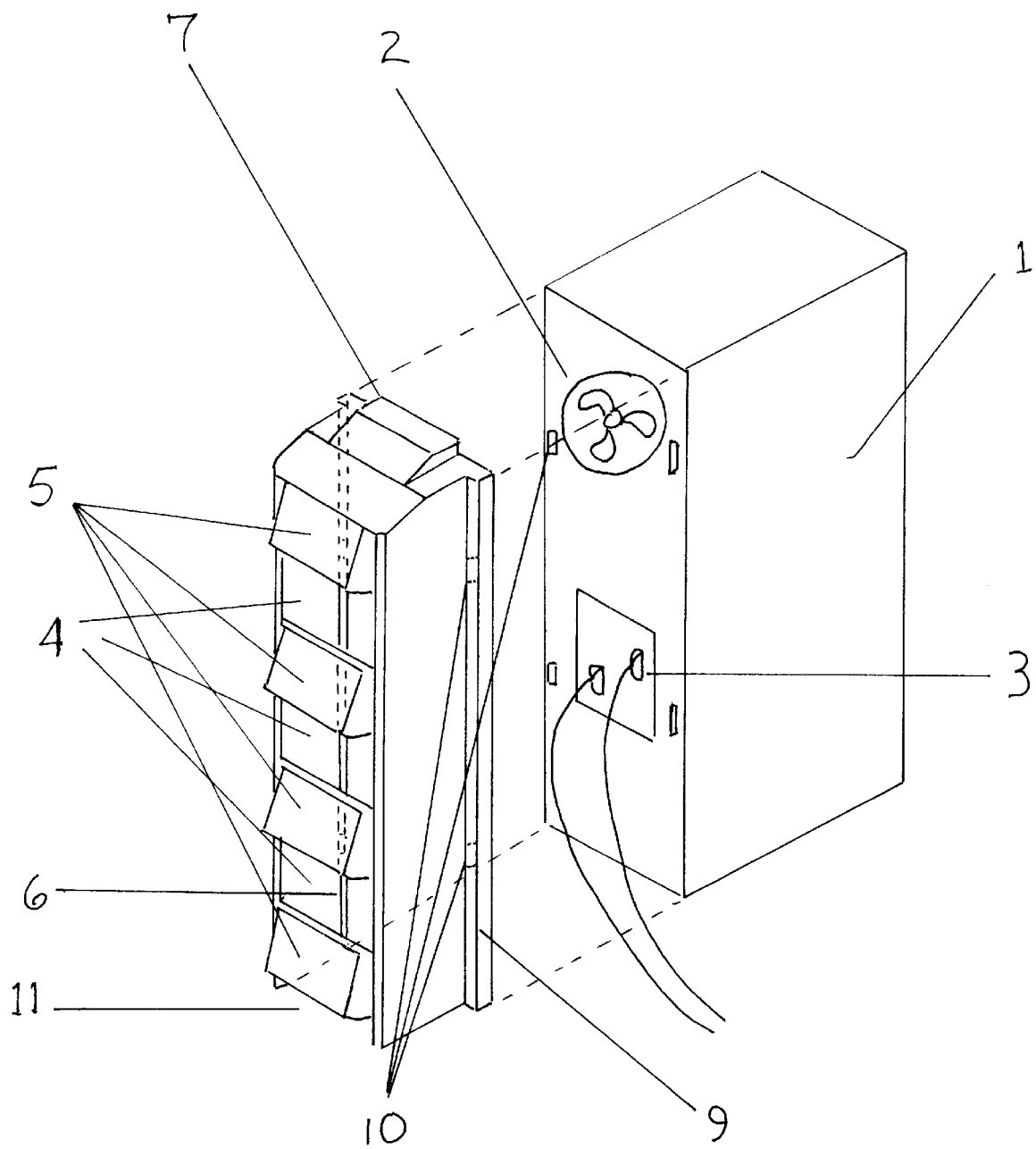
FIG. 3 illustrates a perspective view of an alternate embodiment of the protective cover for a vertically mounted or "tower" type CPU.

FIG. 3 illustrates a perspective view of the protective cover for a vertically mounted tower CPU. Particularly illustrated is the single top vent 7 for venturi airflow, the multiple open spaces for cooling airflow 4, and the multiple shadow flaps 5. Also illustrated are the long CPU frame stress transfer areas 9, and the multiple Hook and Loop Fasteners 10 employed in this embodiment.

FIG. 4 further illustrates the plug cover for the back of a tower CPU by showing top, front, and side views.

FIG. 5 illustrates a prospective view of a yet different embodiment of the plug cover, for the back of a CPU without a rear exiting cooling fan. Particularly illustrated is the lack of top vents or pronounced shadow flap, the shadow area 6 being generated by the shape of the protective cover. Also illustrated is the generous space for plug wires 11 generated with this design.

Alternate embodiments of these configurations have been contemplated to meet the cooling or wiring requirements of various CPU's and their applications. In particular, the strength of the overall cover can be increased by increasing its material thickness.

Various modifications can be made to the present invention without departing from the apparent scope hereof.

I claim:

1. A cover for the back of a computer casing comprising:

a. a molded piece of a structural opaque material,
   b. solid top and side panels, without holes, to create a shadow area beneath said cover at the back of said computer casing,
   c. a conformal shape of said cover to said computer casing to provide vertical shoulders areas on each side of said cover for attachment and force transfer to said computer casing,
   d. a simple means of attachment to the computer casing, requiring little or no modification, to said computer casing which is easily detached and reattached,
   e. the bottom of said cover being open,
   f. a longitudinal flap, defining a vent in a back portion of said cover, said flap creating a shadow, blocking sight of said back of said computer casing from a slight elevation, when exposed to an overhead light source,
   g. the top of said cover having at least one vent which overlaps the vertical plane of the back of said computer casing shadowing incident overhead light on the back of said computer casing,
   h. the depth of said cover being sufficient to extend beyond plugs emanating from the back of the computer casing and to block sight of the back of said computer casing from a slight elevation.

* * * * *